United States Patent [19]

Bush

[11] Patent Number: 4,889,695
[45] Date of Patent: Dec. 26, 1989

[54] RECLAIMING SPENT POTLINING

[75] Inventor: J. Finley Bush, Plum Boro, Pa.

[73] Assignee: Aluminum Company of America, Pittsburgh, Pa.

[21] Appl. No.: 703,322

[22] Filed: Feb. 20, 1985

[51] Int. Cl.⁴ .............................................. C01B 31/02
[52] U.S. Cl. .................................... 423/132; 423/460; 423/461; 423/489; 423/556
[58] Field of Search ............... 423/132, 461, 489, 556, 423/460

[56] References Cited

U.S. PATENT DOCUMENTS

| | | | |
|---|---|---|---|
| 2,858,198 | 10/1958 | McGeer et al. | 423/489 |
| 3,106,448 | 10/1963 | Whicher et al. | 23/88 |
| 3,211,521 | 10/1965 | George et al. | 423/556 |
| 3,485,579 | 12/1969 | Vancil et al. | 423/132 |
| 3,635,408 | 1/1972 | Williams | 241/1 |
| 4,477,425 | 10/1984 | Berry et al. | 423/556 |
| 4,508,689 | 4/1985 | Bush et al. | 423/489 |

FOREIGN PATENT DOCUMENTS 2056422A 3/1981 United Kingdom .
2056425A 3/1981 United Kingdom .
2059403A 4/1981 United Kingdom .

OTHER PUBLICATIONS

Chemical Engineers' Handbook, 5th ed. Ed. by Perry & Chilton, McGraw-Hill Book. Co., 1973 pp. 21–66.
Blayden, Lee C. and Epstein, Seymour G., "Spent Potlining Symposium," *Journal of Metals*, vol. 36, No. 7, Jul. 1984.

Primary Examiner—John Doll
Assistant Examiner—Jeffrey Edwin Russel
Attorney, Agent, or Firm—Douglas G. Glantz

[57] ABSTRACT

Disclosed in a process for recovering aluminum flouride, caustic, and carbon from spent potlining retrieved from an aluminum electrolytic reduction cell. Spent potlining is treated by leaching with a caustic solution to produce a fluoride-rich basic liquor and carbonaceous solid residue followed by contacting the carbonaceous solid with an acid bath of aluminum sulfate and sulfuric acid to produce a fluoride-rich acid liquor.

13 Claims, 1 Drawing Sheet

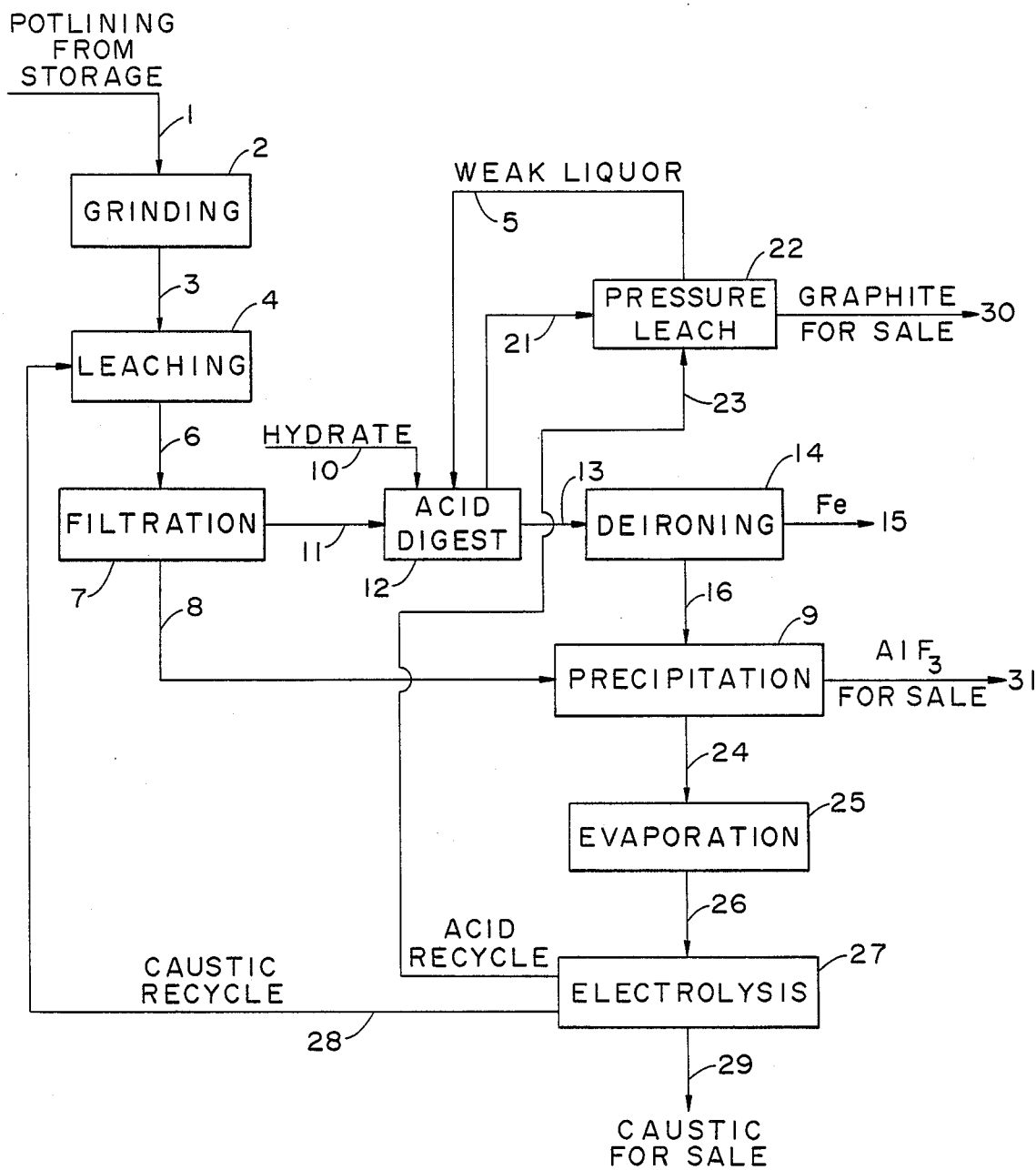

RECLAIMING SPENT POTLINING

BACKGROUND OF THE INVENTION

This invention relates to a process for recovering chemicals, e.g., such as aluminum fluoride, caustic, and graphite, from spent potlining retrieved from an electrolytic reduction cell, e.g., such as for the electrolytic reduction of alumina dissolved in cryolite to produce aluminum metal.

Spent potlining is the carbon lining or potlining which forms the interior sidewalls and bottom of an electrolytic reduction cell. The carbon lining is positioned as a thick lining in the electrolytic reduction cell, often called pot, to provide protection for the steel shell of the cell. The carbon lining also serves as the cathode for the pot by electrical connection to steel cathode bars imbedded in the bottom of the cell. Current is passed from the carbon anode extending downwardly into electrolyte bath, and molten aluminum collects over the bottom and is withdrawn from time to time. The carbon lining can take the form of carbon block or prebaked block joined together with a carbon mix of particulate carbon and suitable binder, or it can be made of carbon mix pressed into place to form a completely monolithic structure of a combination of prebaked and monolithic carbon in different strata. The installed lining typically receives a heat treatment for baking the carbon mix in situ to form a baked, hard mass before the cell is put into operation.

Over an extended continuous operation, the carbon lining continually and progressively deteriorates under the harsh conditions experienced through contact by the fused salts, electrolyte bath, and high temperature of the process. A deteriorated carbon lining leads to failure of the pot by leaking metal or molten bath, distortion in the cathode structure, or unacceptably high iron concentration in the product metal. After an electrolytic reduction pot operates for an extended period, it must be shut down to replace its lining material completely.

Spent potlining disposal techniques include processes in which the spent potlining can be destroyed or utilized in other industrial processes. For example, spent potlining can be used as a substitute for fluorspar in iron melting and steel making. The spent potlining can provide a supplementary fuel in cement manufacture. Fluidized-bed combustion is a process for incinerating low Btu-value materials difficult to burn, and a fluidized-bed combustion of spent potlining theoretically would burn the carbon completely at relatively low temperatures. However, the feasibility of fluidized-bed combustion in spent potlining has not been demonstrated. Spent potlining burns at temperatures of about 1250° C. The carbon potlining residue is converted into disposable ash. Spent potlining is not currently listed as a hazardous waste by the U.S. Environmental Protection Agency, but potentially harmful cyanide and fluoride are leachable during outside storage. Another potential concern relates to fluorides released to the atmosphere when spent potlining is burned.

Pyrohydrolysis has been suggested for burning the carbon in the potlining, raising the temperature to about 1200° C., and reacting the fluorides with steam to produce hydrogen fluoride. In the process, cyanides are destroyed, and hydrogen fluoride is collected as a 25% solution, which is pure enough to make commercial-grade aluminum fluoride. This process is usually limited to low silica spent potlining.

Another way of disposing of spent potlining involves a pyrosulfolysis for recovering fluoride by introducing sulfur dioxide, air, and steam during combustion. Pyrosulfolysis in combination with fluidized-bed combustion recovers fluoride and uses the energy value of the material. Pyrosulfolysis has been suggested as a way to lower the process temperature.

During electrolysis to produce aluminum, the carbon lining absorbs significant quantities of bath materials. Materials penetrating the liner include molten metal and significant amounts of sodium and aluminum ions in the form of cryolite (sodium aluminum fluoride) and other fluorides. Aluminum is found in the form of fluorides, carbides, nitrides, and oxides, and some part of the aluminum is found as fully reduced metal. Bath ingredients of cryolite and alumina with minor amounts of sodium and calcium fluorides are absorbed in their original or other combined states. Carbides and nitrides, notably of aluminum, are formed during the aluminum electrolytic reduction process and are deposited in the carbonaceous material of the lining.

Significant amounts of these potentially valuable chemical materials can be recovered from spent potlining. Several processes have been used or proposed for recovering spent potlining material to obtain fluoride and aluminum values that can be recycled. Many of these processes have been wet processes in which the broken potlining is treated by soaking, washing, cooking, or similar operations with aqueous solutions or liquors for the ultimate recovery of desired chemical compounds. In many cases, the carbon residue is discarded or the process includes heating or roasting to oxidize and dispose of the carbon.

It is known to grind the lining material to a fine size and to separate a carbon fraction from other chemicals by flotation. It is also known that spent potlining will disintegrate over time when exposed to atmospheric air to produce a fine gray powder. Similar changes occur more frequently in wet processes, but the recovered materials are then wet and subsequent handling is inconvenient.

Disintegration of the spent potlining involves chemical reactions between water or humid air and chemicals absorbed in the carbon, such as aluminum carbide and nitride and aluminum oxide. These reactions are presented by the following equations or types of equations:

$$Al_4C_3 + 12H_2O \rightarrow 3CH_4 + 4Al(OH)_3 \qquad (1)$$

$$Al_2N_2 + 6H_2O \rightarrow 2NH_3 + 2Al(OH)_3 \qquad (2)$$

$$Al_2O_3 + 3H_2O \rightarrow 2Al(OH)_3 \qquad (3)$$

Caustic solutions will leach cryolite from the spent potlining. Lime also will react with the potlining chemicals. The lime reaction has been proposed in a process to render cell lining wastes ecologically disposable. An extremely fine calcium fluoride is precipitated and can be separated by screening and isolated by filtration. The calcium fluoride can be used as metallurgical spar or it can be treated to form hydrogen fluoride and aluminum fluoride. The lime leach produces a solution containing dissolved alumina in dilute caustic which can be returned to a Bayer plant.

The recovery of cryolite from spent potlining involves contacting the potlining with a bath of caustic solution which can be drawn from an alumina refinery such as a Bayer plant, and waste liquor can be returned to it. However, the installation of a dry scrubbing process and the slowing of expansion have decreased the demand for cryolite. Other potlining treatment processes can produce materials which are preferred over cryolite recovery such as aluminum fluoride. Sodium fluoride has been recovered from the cryolite recovery plant liquid. Fluorides have been recovered from potlining by vacuum distillation. A roasting process involving dry caustic reaction has been suggested so that fluorine and alumina become water soluble, and leaching is simpler and more rapid.

Crushed potlining has been exposed to stream at about 15 psi gauge or higher to break down the carbides and nitrides. Solids from the hydrator are screened to produce a coarse material suitable for reprocessing in the cell linings. The finer fraction contains fluoride and oxide.

Sulfuric acid treatement for potlinings involves problems including process conditions giving manageable nonsticking/potlining-acid mixtures, separation of silicon tetrafluoride from the hydrofluoric acid gas evolved from the cell, and operation of a kiln or sintering machine to burn out the carbon and evolve sulfur dioxide which can be used to make sulfuric acid.

Other processes are under investigation for the recovery of fluorine from potlining as aluminum fluoride. One of these processes involves electrodialysis. A relatively pure solution of sodium fluoride is produced by digesting potlining in caustic. The potlining is treated with dilute caustic to produce a solution of sodium fluoride and sodium aluminate, followed by evaporative crystallization of sodium fluoride and subsequent filtering, washing, and redissolution. The potlining alternatively can be digested in strong caustic to convert the cryolite into a soluble sodium aluminate and an insoluble sodium fluoride that can be removed, e.g., by filtration, then washed, and redissolved. Double-decomposition electrodialysis will convert the sodium fluoride to sodium sulfate in aqueous hydrogen fluoride. The water-splitting membrane will produce sodium hydroxide and hydrogen fluoride. Hydrogen fluoride can be reacted with solid alumina hydrate to produce aluminum fluoride or it can be reacted with solution to give aluminum hydroxyfluoride. Cyanides present in the potlining are extracted into the caustic and can be destroyed by returning the sodium aluminate to a Bayer digestion circuit or by spray-drying it.

It is an object of the present invention to provide a process for recovering halogen in high yield from carbonaceous material.

It is another object of the present invention to provide a process for recovery of fluorine from spent potlining in an environmentally acceptable form.

It is a further object of the present invention to recover raw materials from spent potlining in an environmentally acceptable form.

It is still a further object of the present invention to recover raw materials from spent potlining in a unit operation of reduced cell size and requiring lower amounts of sulfuric acid/aluminum sulfate and sodium hydroxide.

It is another object of the present invention to recover materials from spent potlining through an acid digest and to reduce the size of the acid plant significantly.

It is another object of the present invention to increase the concentration of aluminum fluoride in the product of the process of recovering raw materials from spent potlining.

It is still a further object of the present invention to reduce the recycled caustic of the total plant load for a process for recovering materials from spent potlining.

These and other objects of the present invention will become apparent from the description of the process which follows.

SUMMARY OF THE INVENTION

In accordance with the present invention, the process for recovering halogen from carbonaceous material includes the steps of contacting the carbonaceous material containing halogen with caustic solution to produce halogen-rich basic liquor and carbonaceous solid and contacting the carbonaceous solid in an acid bath of aluminum sulfate and sulfuric acid to produce a halogen-rich acid liquor. In one embodiment, the invention provides a process for recovering and producing aluminum fluoride, caustic, and purified carbon from spent potlining retrieved from an electrolytic reduction pot for the production of aluminum from alumina in cryolite.

BRIEF DESCRIPTION OF THE DRAWING

The FIGURE provides a schematic flow diagram for a process for recovering raw materials from spent potlining.

DETAILED DESCRIPTION

Spent potlining removed from an electrolytic reduction cell for the production of aluminum from alumina dissolved in cryolite is crushed to $-10$ cm and placed in a stockpile. The stockpiled material is crushed further to $-1.1$ cm and fed to a storage tank used to feed the process of the present invention.

Referring now to the Figure, feed from storage is mixed with recycled filtrate liquor (not shown) to form a 25% slurry and is passed in line 1 to grinding station 2 where the material in slurry is ground to $-100$ microns in a ball mill. Optional magnetic separations (not shown) can remove tramp and weakly magnetic iron.

Ground spent potlining solids from the ball mill are passed in line 3 to caustic leaching station 4. The ground spent potlining is leached in countercurrent extraction with a caustic solution having a concentration of about 14 g/L sodium hydroxide.

In one aspect, the caustic can be supplied by Bayer spent liquor. The caustic leach removes approximately 55% of the fluoride in the lining. Overflow liquor in line 6 from a first stage in the leaching station is split into two parts. The first part is filtered and sent downstream in line 8 to the aluminum fluoride precipitation unit 9. The second part is used to form the slurry with fresh spent potlining fed to grinding station 2. Slurry from the last stage is filtered to remove liquor and the filtrate is returned to the leaching system of station 4.

Solids from filtration station 7 are passed in line 11 to the acid digest 12. The solids are contacted in a countercurrent unit with an aluminum sulfate/sulfuric acid mixture in a two-stage digester at or below 105° C. The two-stage digester provides a high fluoride concentration in the final liquor. Hydrate in line 10 and sulfuric acid are added to the second stage of the digester to maintain the proper $Al_2(SO_4)_3/H_2SO_4$ ratio of about 0.75 to 1.0. Synthetic flocculent aids settling. Solids from the second stage is centrifuged and washed. Hydrogen cyanide released during the acid digest is collected and burned in a heat recovery incinerator.

Fluoride-rich acid liquor from acid digest 12 can be pressure filtered (not shown) to remove solids. The acid liquor then is pumped in line 13 to deironing station 14. Ferrous ion in the liquor is converted to ferric ion by contact with air. Iron is extracted by commercially available aliphatic extraction system. Clean liquor is pumped in line 16 to precipitator 9. Iron is removed at 15.

The deironed liquor is neutralized rapidly in precipitator 9 at a pH of about 5.2 to 5.6 by cryolite liquor in line 8. The pH and temperature must be controlled carefully in the precipitator. Aluminum fluoride solids are filtered and washed three times (not shown) before admixture with a dispersant and transfer to calcination (not shown). Calcined material is stored for shipment at 31. Filtrate is pH adjusted to provide high fluoride removal through cryolite solids precipitation, and it then is filtered, and sent to evaporation. The solids can be returned to the acid digest (not shown).

Dispersed filtered cake is spray-dryed and calcined in a fluid bed type calciner to smelting specifications. The pH adjusted and filtered liquor from precipitator 9 is fed in line 24 to the evaporator 25. The dilute liquor has a low concentration of sulfate ion. The evaporator increases the concentration of sodium sulfate to about 25-30% by weight. Cell operating efficiency is higher at higher sodium sulfate concentration. Evaporator discharge is fed in line 26 to an electrochemical cell 27 to produce the sulfuric acid and the caustic recycle in line 28, streams and caustic for sale at 29. Caustic for sale is evaporated to a concentration of about 50% by weight for use in a Bayer refinery. The quality of this caustic is high because of low chlorides in the process streams and rejection rates for sulfate ion by the membranes.

Washed mud from digestion is passed in line 21 to pressure leach station 22. The washed mud is processed through flotation (not shown) to remove and separate insulation materials from the carbon. Insulation materials include cell insulation brick used to prevent heat loss in bottom of an electrolytic reduction cell. Purified graphite mixed with recycled acid in line 23 is pressure-digested to remove additional alumina, fluoride, and sodium values. The graphite is filtered, washed, and dried for sale at 30. The filtrate is returned to the acid leach as weak acid in line 5.

The process of the present invention requires only a minimum quantity of aluminum sulfate/sulfuric acid. The aluminum sulfate required in prior art processes to hold aluminun fluoride in solution now is used to convert additional sodium fluoride to aluminum fluoride. The present invention reduces the electrolysis requirement of the process by over 50% and increases aluminum fluoride product purity from about 53% to about 92% by weight.

What is claimed is:

1. The process for recovering halogen from carbonaceous material comprising:
    (a) leaching carbonaceous material containing halogen with a caustic solution to produce a halogen-rich basic liquor and a carbonaceous solid; and
    (b) contacting said carbonaceous solid with an acid bath of aluminum sulfate and sulfuric acid to produce a halogen-rich acid liquor.
2. The process as set forth in claim 1 wherein said carbonaceous material comprises lining from an electrolytic production cell.
3. The process as set forth in claim 2 wherein said halogen consists essentially of fluorine.
4. The process as set forth in claim 3 wherein said acid contacting takes place at a temperature at or below about 105° C.
5. The process as set forth in claim 4 wherein said acid bath has an aluminum sulfate/sulfuric acid ratio of about 0.75 to 1.0.
6. The process as set forth in claim 5 wherein said caustic solution has a concentration of about 14 g/L NaOH.
7. The process as set forth in claim 6 wherein said caustic solution comprises spent Bayer liquor.
8. The process as set forth in claim 6 wherein said halogen-rich acid liquor is passed to continuous precipitation.
9. The process as set forth in claim 8 wherein said acid liquor further is processed through precipitation step comprising rapid neutralization by cryolite liquor.
10. The process as set forth in claim 9 further comprising separating carbon from insulation materials.
11. The process as set forth in claim 10 wherein said separation of insulation materials from carbon comprises flotation treatment.
12. The process as set forth in claim 11 wherein said leaching and said contacting is provided by a countercurrent flow multi-stage unit operation.
13. The process for recovering fluorine from spent potlining from an aluminum electrolytic reduction cell comprising:
    (a) grinding the potlining to a particle size less than about 100 microns,
    (b) leaching the ground spent potlining with a caustic solution to produce a fluoride-rich basic liquor and a carbonaceous residue,
    (c) filtering, returning a portion of the filtrate for grinding,
    (d) contacting said carbonaceous residue with an acid bath of aluminum sulfate and sulfuric acid at a ratio of about 0.75 to 1.0,
    (e) deironing, and
    (f) separating carbon from insulation materials from the acid leaching.

* * * * *